Figure 1:
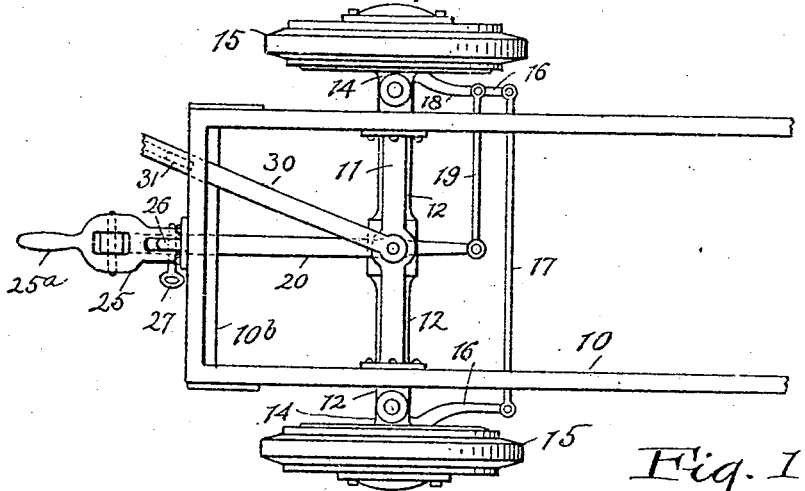

July 13, 1926.

G. R. PENNINGTON 1,591,996

TRAILER STEERING MECHANISM

Filed May 1, 1920

Inventor
Gordon R. Pennington
by
Thurston Kwis & Anderson
Attorneys

Patented July 13, 1926.

1,591,996

UNITED STATES PATENT OFFICE.

GORDON R. PENNINGTON, OF CLEVELAND, OHIO, ASSIGNOR TO WARNER MANUFACTURING COMPANY, OF BELOIT, WISCONSIN, A CORPORATION OF WISCONSIN.

TRAILER STEERING MECHANISM.

Application filed May 1, 1920. Serial No. 378,065.

This invention is an improvement upon the trailer steering mechanism which forms the subject matter of my prior Patent No. 1,174,471, granted March 7, 1916; the object being to provide a construction which is efficient and yet simpler, more durable and less expensive than the specific construction shown in said patent, in which the generic invention therein claimed is embodied. The invention consists in the construction and combination of parts shown in the drawing, hereinafter described and pointed out definitely in the appended claims.

Figure 2:
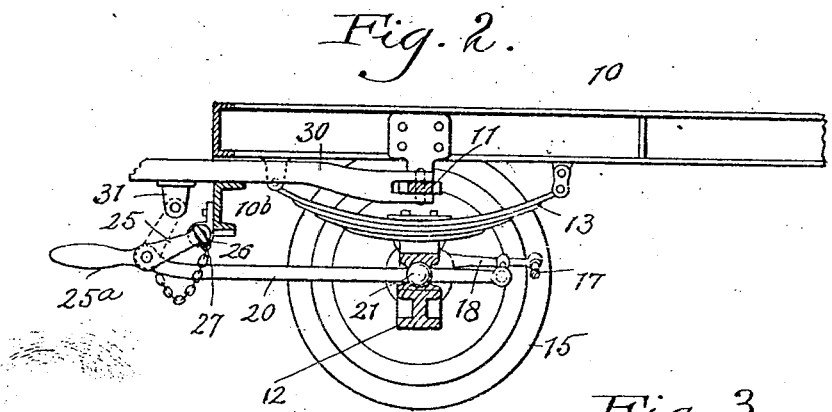
Figure 3:
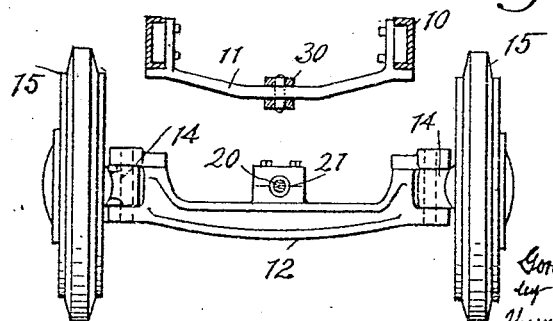

In the drawing, Fig. 1 is a plan view of one end of a trailer truck with the present invention applied to it; Fig. 2 is a sectional side elevation of the part shown in Fig. 1; Fig. 3 is a cross sectional elevation of the frame and drawbar connections as mounted above the axle.

The trailer includes a stiff frame 10 of any suitable construction, and the mechanism shown and herein described at each end thereof.

12 represents a transversely extended axle upon which the body may be suspended by any suitable spring suspension, such for example as the half-elliptic springs 13, on each side secured to the axle and having their ends connected by shackles with the body frame.

The axle per se, is substantially like the steering axle used on motor vehicles in that at each end of said axle there is a steering knuckle 14, which is pivoted on a vertical axis to the end of the axle. A wheel 15 is rotatably mounted upon each knuckle. Each knuckle is provided with a rearwardly extended arm 16; and the two arms 16 are connected together in the usual way by a link 17. One of the steering knuckles is provided also with a steering arm 18.

A steering bar 20 is pivotally mounted on the axle, midway between its ends, in such a manner that it may swing both horizontally for the purpose of steering the vehicle and vertically to such extent as is necessary when, as the springs flex, the body moves toward or from the axle. A ball and socket joint 21 is shown as the means for pivoting this bar to the axle in order that the bar may have the described movements relative to the axle. The rear end of this bar is connected to the steering arm 18 by means of a link 19, which usually and preferably has a ball and socket joint with both the steering arm 18 and bar 20.

Located above this arm 20 and pivoted to a cross member 11 of the body on a pivot which is aligned with the vertical axis of the ball and socket connection between this bar 20 and the axle, is a drawbar 30, which drawbar extends from its pivotal connection over and beyond the end member 10$^b$ of the frame. The free end of the drawbar is constructed so as to make it easy to attach it to a tractor or other draft instrumentality.

A link 25 is pivoted to the front end of the steering bar 20 on a horizontal transverse axis. A lug 31 is secured to the underside of the drawbar; and a similar lug 26 is secured to the end member 10$^b$ of the frame. The pivoted axis of the link 25 is substantially equi-distant from the two lugs 26 and 31; and the link is bifurcated at one end and is of such length that it can be connected by a pin 27 to either lug. The slot in the link through which the pin 27 passes may be slightly elongated so that there will be no danger of breaking the link or lugs as the body moves up or down relatively to the axle.

When the link is connected with the lug 26 on the frame, the steering bar is held in the central position with respect to said frame, and the wheels are held parallel with the sides of the frame. This is the connection which will be made ordinarily when the trailer is attached to a tractor by similar mechanism, not shown, at the other end of the machine, or when the tractor is attached to the associated drawbar shown, and it is desired to back the tractor and trailer. The said drawbar may, during the backing, take any position. But when the tractor and trailer are being backed, the steering bar (not shown) at the other end of the trailer may be disconnected from both the frame and associated drawbar; and a man may take hold of the steering bar and thereby operate the associated steering wheels to steer the trailer. It will be noted that the link 25 is formed with an extension 25$^a$. This may be used as a handle to swing the link into the required positions for connecting it to either of the lugs 31 or 26; and it is also a convenient handle for the man who is manipulating the steering bar 20 for the purpose stated.

When, however, a tractor is secured to the drawbar at that end of the machine shown in the drawing, and is pulling the trailer after it, it is desirable that, as the tractor is turned to one side or the other and causes the drawbar to correspondingly swing upon its pivot, this swinging movement of the drawbar shall turn the steering wheels of the trailer to a sufficient extent to cause the trailer to follow the tractor. When this action is desired the link 25 on the steering bar is connected with the drawbar lug 31 so that the steering bar must swing in unison with the drawbar.

Having described my invention, I claim:—

1. In a vehicle, the combination of a frame, an axle on which said frame is supported, steering wheels mounted on the ends of said axle, a steering bar pivoted to said axle and projecting beyond the end of said frame, means connecting said steering bar with the wheels, a draw bar pivotally attached to said frame and a link pivoted to the steering bar at the front end thereof, said link being adapted to be locked directly to the frame or directly to the draw bar at a point in front of said frame.

2. In a vehicle, the combination of a frame, an axle upon which said frame is supported, steering wheels mounted on the ends of said axle, a steering bar pivoted on the axle and connected to said wheels, a draw bar pivoted to said frame, a link pivoted to said steering bar near the front end thereof on a horizontal transverse axis, two lugs secured respectively to the draw bar and the frame at points substantially equidistant from the pivot of said link, and means for locking said link in direct engagement with either of said lugs or for detaching said link from both lugs to permit the steering bar to be swung manually in any direction.

3. In a vehicle, the combination of a frame, an axle, springs through which the frame is supported upon said axle, steering wheels mounted on the ends of the axle, a steering bar having a ball and socket pivotal connection with the axle and movable vertically and horizontally, means connecting the rear end of said steering bar with said wheels, a draw bar having a pivotal connection with the frame in vertical alinement with said ball and socket joint, a link pivoted on a horizontal transverse axis upon said steering bar near the front end thereof and having a bifurcated end intersected by a transverse hole, two lugs connected respectively with the draw bar and the frame, each lug having a transverse hole, said lugs being selectively engageable with the bifurcated end of said link, and a pin insertable through said link and either of said lugs when engaged therewith to lock said link and lug in such engagement.

In testimony whereof, I hereunto affix my signature.

GORDON R. PENNINGTON.